United States Patent
Tauber et al.

[15] 3,640,754
[45]

[54] GLAZING CONCRETE

[72] Inventors: Elisha Tauber; Maxwell John Murray, both of Victoria, Australia

[73] Assignee: Commonwealth Scientific and Industrial Research Corporation, East Melbourne, Victoria, Australia

[22] Filed: Dec. 12, 1968

[21] Appl. No.: 783,350

[30] Foreign Application Priority Data

Dec. 12, 1967 Australia .............................. 31060/67

[52] U.S. Cl. ................................ 117/70 B, 106/48, 106/49, 117/125
[51] Int. Cl. ......................................... B44d 1/20, C03c 5/00
[58] Field of Search ................. 107/62, 63, 70 B, 70 D, 70 S, 107/71 R, 123 A, 125, 160 R; 106/48, 49

[56] References Cited

UNITED STATES PATENTS

| | | | |
|---|---|---|---|
| 2,741,008 | 4/1956 | Snoddy | 117/125 X |
| 3,035,937 | 5/1962 | Baldauf et al. | 117/70 X |
| 3,063,851 | 11/1962 | Madison | 117/62 X |
| 3,086,880 | 4/1963 | Compton | 117/125 X |
| 3,144,344 | 8/1964 | Umhoefer | 117/70 X |
| 3,249,460 | 5/1966 | Gerry | 117/70 |
| 3,307,958 | 3/1967 | Earl | 117/125 X |
| 3,384,508 | 5/1968 | Bopp et al. | 117/125 X |
| 3,403,043 | 9/1968 | Thompson | 117/123 X |
| 3,418,156 | 12/1968 | Medert et al. | 117/125 X |
| 3,463,647 | 8/1969 | Kosiorek et al. | 117/125 X |

FOREIGN PATENTS OR APPLICATIONS

| | | | |
|---|---|---|---|
| 200,612 | 1/1956 | Australia | 117/70 |
| 780,584 | 8/1957 | Great Britain | 117/125 |

*Primary Examiner*—William D. Martin
*Assistant Examiner*—M. R. Lusignan
*Attorney*—Ward, McElhannon, Brooks & Fitzpatrick

[57] ABSTRACT

This invention relates to a precess for glazing the surface of an article made of concrete. A glaze composition is applied to the surface and fired onto the surface at 550°–620° C. Glaze compositions of the invention comprise, proportionately, A: – 1.4 to 2.6 moles $SiO_2$
B: – 0.1 to 0.2 mole $TiO_2$
C: – 0.4 to 0.9 mole PbO
    0.1 to 0.6 mole $Na_2O$
    0.0 to 0.2 mole $Li_2O$
    0.0 to 0.3 mole ZnO (the sum of amounts of PbO, $Na_2O$, $Li_2O$ and ZnO, expressed in moles, is 1).

In a preferred aspect, after the concrete is fired it is recured to regain a substantial proportion of the strength lost in firing. Recuring is done by exposing to moisture such as by weathering, immersion in water to autoclaving.

12 Claims, 4 Drawing Figures

GLAZING CONCRETE

BACKGROUND OF THE INVENTION

This invention relates to the glazing of articles comprised of hydraulic cement and seeks to provide techniques and compositions whereby a fired glaze can be produced on a surface of an article comprised of hydraulic cement, particularly Portland cement, in order to produce a permanent and resistant finish on the surface for decorative and/or protective purposes. Such articles may include for example articles made from concrete such as concrete pipes, troughs and the like for carrying fluids and solids of many kinds, concrete panels, blocks, tiles and slabs for building or decorative purposes and fiber reinforced bodies, such as concrete asbestos shingles and panels.

The production of satisfactory glazes on hydraulic cement is made difficult by the fact that the firing of hydraulic cement at temperatures normally used for glazing hydraulic it to partially lose mechanical strength. Further, it is difficult to obtain continuous glazes as articles comprised of hydraulic cement generally have rough surfaces and this results in discontinuities in the glaze layer.

This invention in its various aspects seeks to provide solutions to the above-mentioned problems and also to provide new glaze compositions especially suited for glazing bodies comprised of hydraulic cement.

PRIOR ART

In the prior art (Australian Pat. No. 200,612) it was proposed to produce bodies comprised of aggregate material and hydraulic cement having a vitreous surface coating comprising two separately fused layers said layers being produced by firing a fritted glaze at a temperature of between about 1,000° F. and 1,500° F. (538°–816° C.). We have found, in fact, that if an article comprising a filler (e.g., an aggregate) and hydraulic cement is heated above 650° C., it fails to retain sufficient strength for subsequent treatment or handling. However, we have found that firing of such articles at about 550° to 620° C. permits the article to retain sufficient strength to allow subsequent processing of the article, including after treatments to substantially restore the original strength of the article.

It should be noted that the firing temperatures described herein in relation to our invention are the temperatures reached by the surface of the article undergoing firing.

SUMMARY OF THE INVENTION

The low firing temperatures of our method necessitate the use of glazes with a correspondingly low maturing temperature. Accordingly, we have investigated glaze compositions suitable for firing at 550° to 620° C. and have found that glaze compositions suitable for this purpose comprise, proportionately, A
  1.4 to 2.6 moles $SiO_2$
B
  0.1 to 0.2 mole $TiO_2$
C
  0.4 to 0.9 mole PbO
  0.1 to 0.6 mole $Na_2O$
  0.0 to 0.2 mole $Li_2O$
  0.0 to 0.3 mole ZnO wherein the sum of the amounts of PbO, $Na_2O$, $Li_2O$ and ZnO in C, expressed in moles, is 1.

Preferred glaze compositions are those comprising, proportionately,

A
  1.41 to 2.54 moles $SiO_2$
B
  0.105 to 0.190 mole $TiO_2$
C
  0.516 to 0.744 mole PbO
  0.070 to 0.097 mole ZnO
  0.128 to 0.264 mole $Na_2O$
  0.000 to 0.151 mole $Li_2O$ and C sums to 1 as before.

Particularly preferred are those comprising, proportionately,

A
  1.9 to 2.0 moles $SiO_2$
  0.13 to 0.18 mole $TiO_2$
C
  0.5 to 0.9 mole PbO
  0.0 to 0.1 mole ZnO
  0.1 to 0.5 mole $Na_2O$ and C sums to 1 as before.

The glaze compositions defined above are suitable for firing at 550° to 620° C. and satisfactory glazes are obtainable with a single firing.

Accordingly in one aspect of the present invention provides a method of glazing a surface consisting essentially of hydraulic cement which comprises applying to said surface a glaze composition consisting essentially of, proportionately (A) 1.4 to 2.6 moles $SiO_2$, (B) 0.1 to 0.2 mole $TiO_2$ and (C) 0.4 to 0.9 mole PbO, 0.1 to 0.6 mole $Na_2O$, 0.0 to 0.2 mole $Li_2O$ and 0.0 to 0.3 mole ZnO wherein the sum of the amounts of PbO, $Na_2O$, $Li_2O$ and ZnO, expressed in moles, is 1, the balance, if any, consisting of conventional coloring and opacifying agents; and thereafter firing the glaze composition at a temperature in the range 550° to 620° C. to produce a glaze on said surface.

As indicated above, however, even firing at 550° to 620° c. must inevitably reduce the strength of the hydraulic cement but we have found that at least a substantial proportion of the lost strength can be regained if the fired article is exposed to moisture, such as by natural weathering, immersion in water or autoclaving, to cure the hydraulic cement.

As previously mentioned, articles made of hydraulic cement generally have rough surfaces and it is difficult to obtain a smooth and continuous glaze on them. An attempt was made to overcome this problem in the prior art stated above by a second application of a glaze composition and a second firing but we have found that this is an unsuitable solution as the strength of the hydraulic cement is likely to be excessively reduced.

Accordingly, experiments were conducted to find methods of producing smooth and continuous glazes with one firing and it was found that satisfactory results were obtained by applying two layers of glaze composition (which may be the same or different) and then firing but better results were obtained by applying the glaze composition over and underglaze composition comprised of a glaze composition (which could be the same as or different from the first said composition) and a refractory material; the refractory material being present in a range of particle sizes and adapted to substantially fill imperfections and discontinuities in the surface of the article; the compositions being fired simultaneously. The actual range of sizes to be used will depend on the nature of the surface of the article to be glazed but a typical formulation based on sand from Frankston, Victoria, comprised

| Mesh Size (BSS) | Approximate % by weight |
| --- | --- |
| 28 | 30 |
| 48 | 26 |
| 100 | 15 |
| 150 | 11.5 |
| 200 | 9.8 |
| 325 | 7.9 |

For relatively rough surfaces it may be necessary to increase the coarseness of and the amount of coarse refractory material and vice versa for relatively smooth surfaces.

The glazes of this invention may be prepared by the conventional techniques of melting together the appropriate raw materials to give a frit of the desired composition. The frits are quenched and then finely ground and suspended in a suitable aqueous medium for application to the hydraulic cement surface. Application of the glaze composition to the surface requires no special techniques and the aqueous suspension may be applied by brushing, spraying, or roller application or any other suitable technique.

As mentioned above, the method of the invention is applicable to most conventional types of concrete. In the building industry these are usually one of three types, namely lightweight aggregate concretes, concretes with natural rock aggregates and concretes formed from mixtures of sand and cement. However, while the process of this invention can be applied to all of these concrete types we have found that most satisfactory results are obtained with concretes formed from natural rock aggregates (e.g., basalt). Satisfactory glazes can be formed on the other types of concrete but the loss of mechanical strength on firing is usually somewhat greater for said other types.

Concretes formed from lightweight aggregates (e.g., "bloated" shales), particularly if formed by pressing, lead to some difficulties in glazing as during or after the firing some of the aggregate particles tend to disintegrate thus producing spalling and flaking off of the glaze from the concrete surfaces. This effect can, however, be minimized or eliminated entirely in some cases by prefiring the concrete article before applying and firing the glaze composition. The above treatments are also applicable to fiber reinforced (such as glass and asbestos) concrete.

BRIEF DESCRIPTION OF THE SEVERAL VIEWS OF THE DRAWINGS

This invention will now be further illustrated by the following examples and by reference to the accompanying drawings in which.

EXAMPLE I

STRENGTH OF UNGLAZED CONCRETE AFTER HEATING AT 550° to 620° C. AND THEREAFTER RECURING

Concrete roofing tiles were tested for transverse breaking strength by the method of Australian Standard A158–1967, masonry blocks were tested for compressive strength and paving slabs were tested for modulus of rupture over a span of 13 inches. The tiles, blocks and slabs were then fired at 600° C. and allowed to cool.

Figure 1:
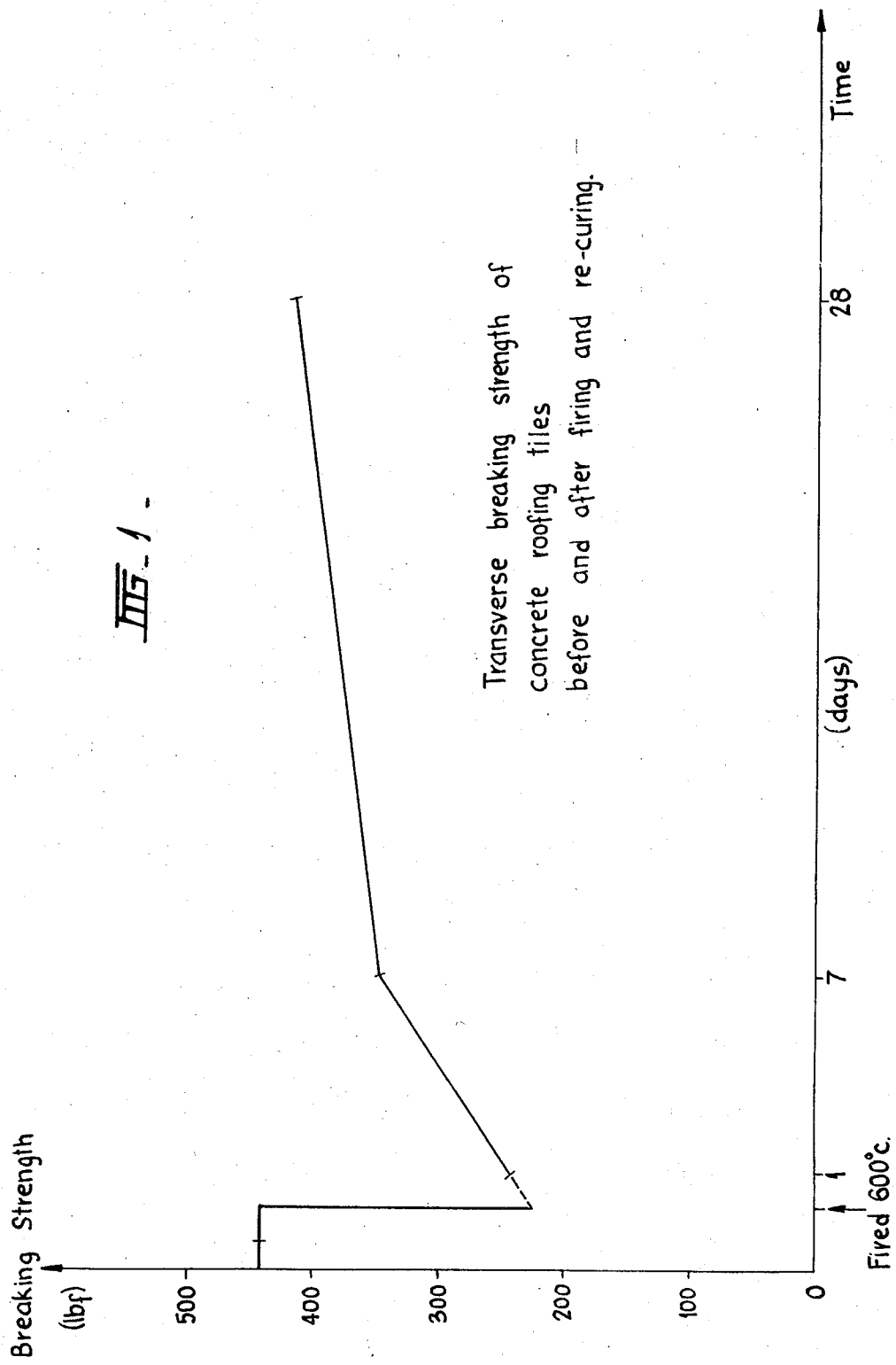
FIG. 1 is a graph showing the transverse breaking strength of unglazed concrete roofing tiles before and after firing and recuring.

The tiles were then immersed in water for 1 day and were tested for transverse breaking strength 1, 7 and 28 days after firing. Results for the tiles are shown in FIG. 1.

Figure 2:
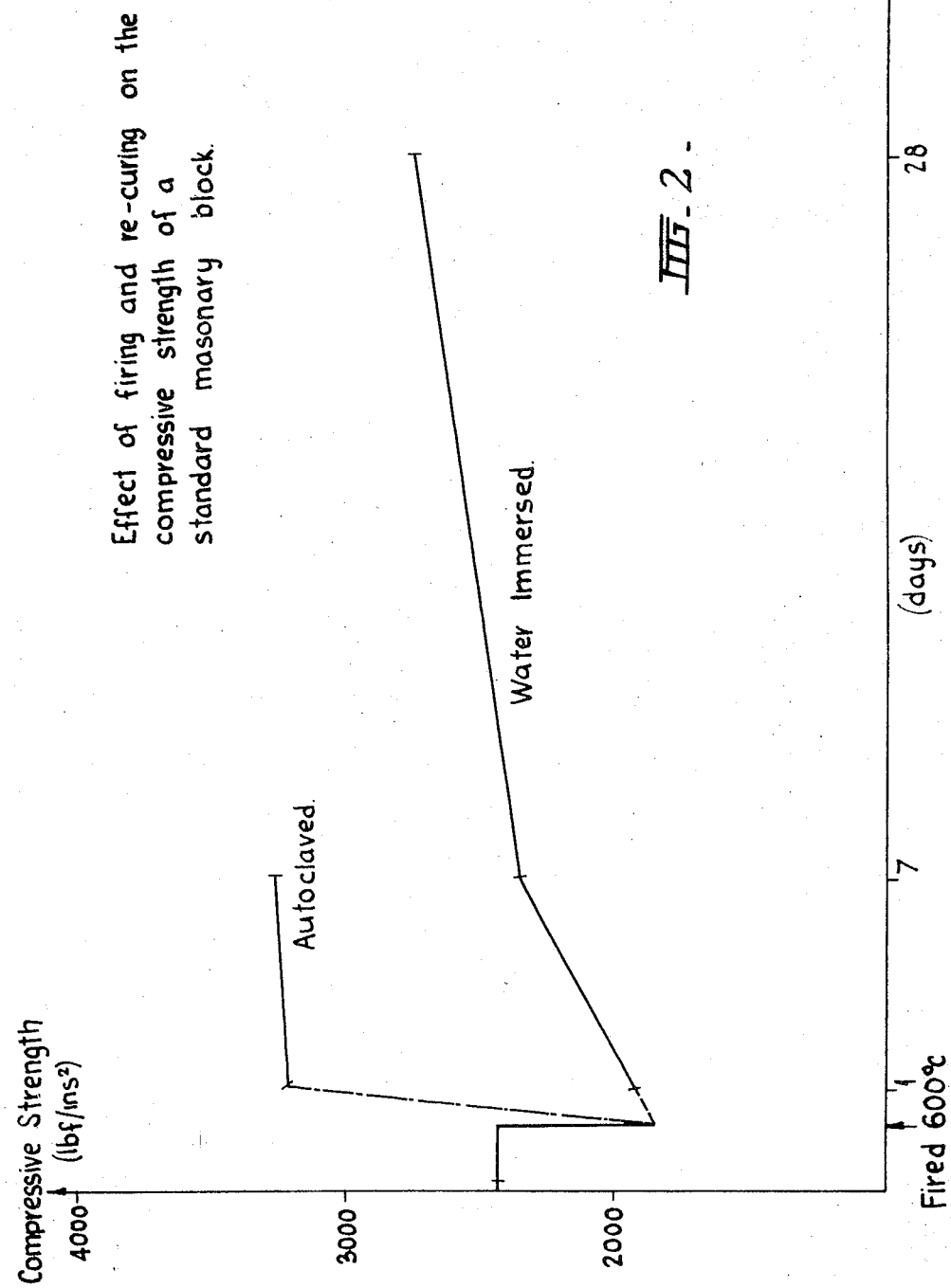
FIG. 2 is a graph showing the effect of firing and recuring on the compressive strength of a standard masonry block.

Some of the blocks were immersed in water for 1 day and tested for compressive strength 1, 7 and 28 days after firing. Other blocks were placed in an autoclave for 1 day and tested for compressive strength 1 and 7 days after firing. Results are shown in FIG. 2.

Figure 3:
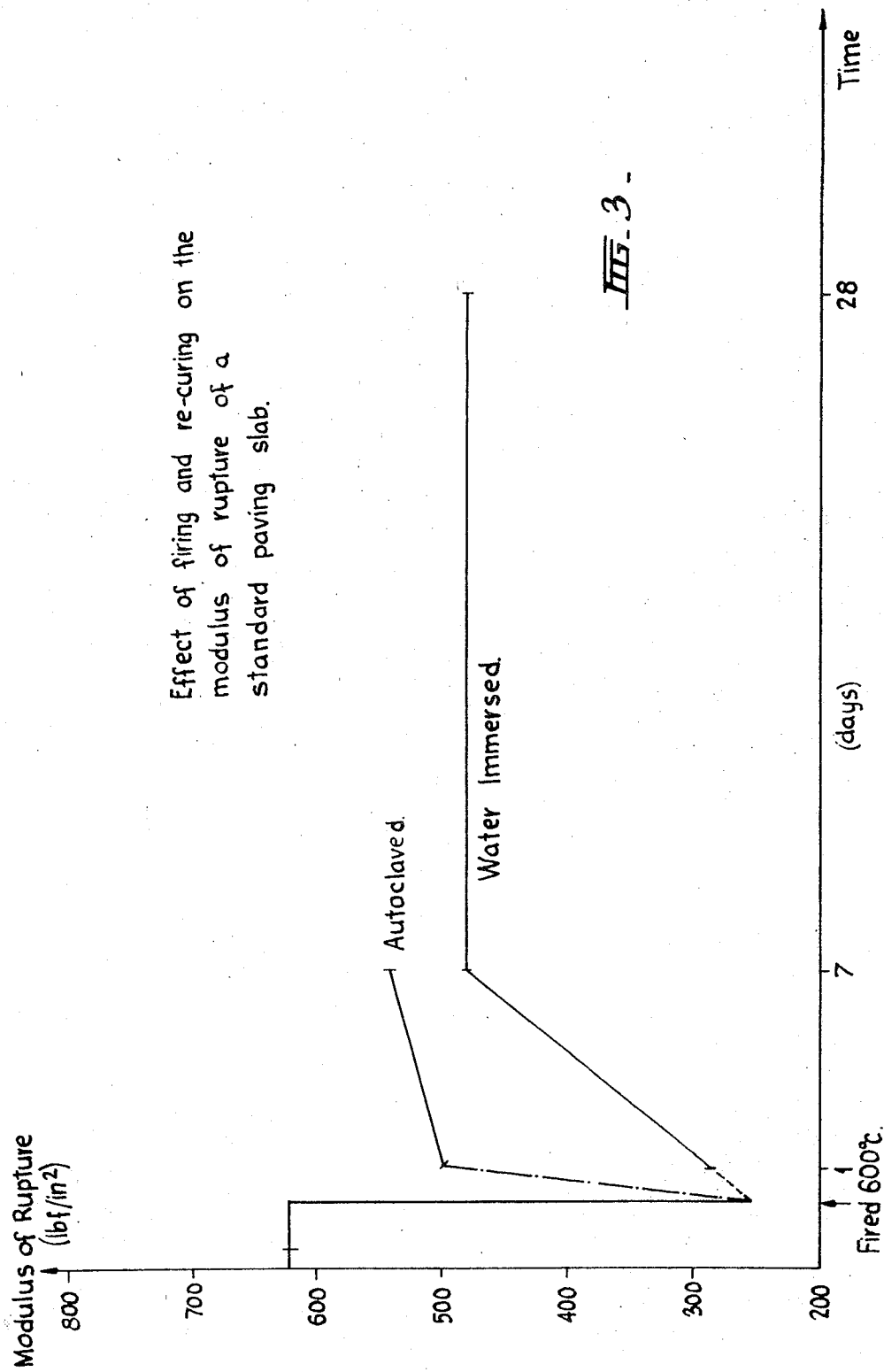
FIG. 3 is a graph showing the effect of firing and recuring on the modulus of rupture of a standard paving slab.
Figure 4:
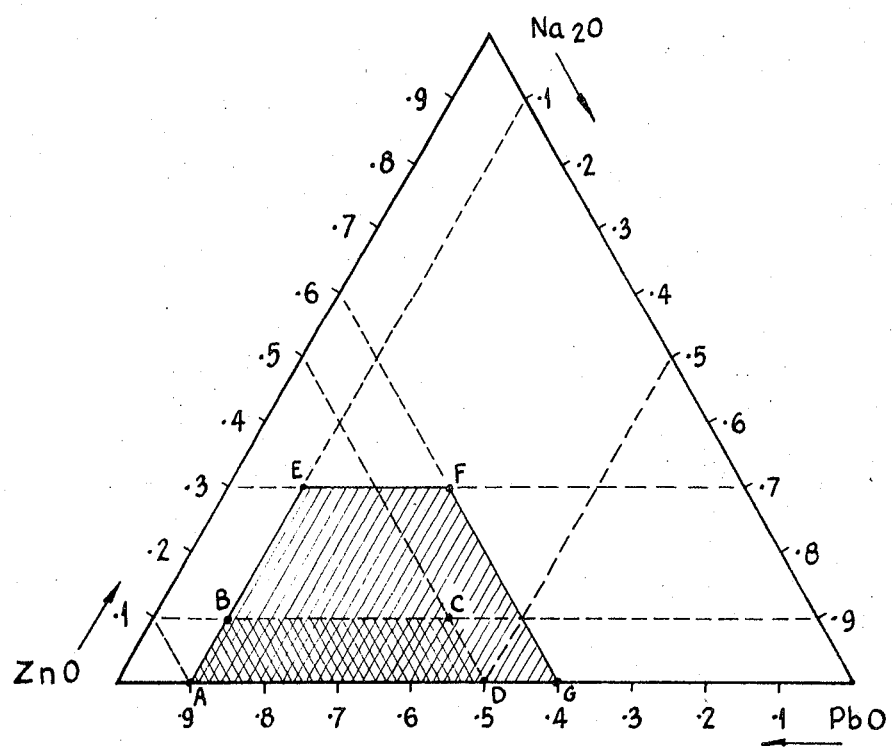
FIG. 4 is a three component chart showing preferred glaze composition ranges.

Some of the slabs were immersed water for 1 day and others were autoclaved for 1 day. The slabs were tested for modulus of rupture at 1, 7 and 28 days after curing in the case of water immersion and 1 and 7 days after cooling in the case of autoclaving. Results are shown in FIG. 3.

EXAMPLE II

GLAZE COMPOSITIONS
Glazes comprising
A an acid component
B an amphoteric component, and
C an alkali component
were tested.

$SiO_2$ was used as A and $TiO_2$ as B and experiments were carried out to determine the preferred range of A and B.

Preferred ranges found for $SiO_2$ and $TiO_2$ are those previously set out and we found that most preferred was $SiO_2$ and $TiO_2$ in the mole proportion of 1.024 and 0.146, respectively.

With A and B fixed at, proportionately, 1.924 moles $SiO_2$ and 0.146 moles $TiO_2$, further experiments were conducted to determine the preferred range of the components C.

It was found that component C should contain, proportionately, 0.4 to 0.9 mole PbO, 0.1 to 0.6 mole $Na_2O$, 0.0 to 0.2 mole $Li_2O$ and 0.0 to 0.3 mole ZnO, more preferably 0.516 to 0.744 mole PbO, 0.128 to 0.264 mole $Na_2O$, 0.000 to 0.151 mole $Li_2O$ and 0.070 to 0.097 mole ZnO. (It is to be noted that the amounts of PbO, $Na_2O$, $Li_2O$ and ZnO is C, expressed in moles, are to sum to 1).

It was found that glaze compositions without lithia were particularly preferred and an experiment was conducted to find the best range of PbO, ZnO and $Na_2O$ with 1.924 mole $SiO_2$ and 0.146 mole $TiO_2$ as follows:

A test plate consisting of an equilateral triangular refractory plate, having a series of small cavities in its surface arranged in the manner of a three component chart, was prepared by placing in each cavity a glaze composition comprising $SiO_2$, $TiO_2$, PbO, ZnO and $Na_2O$. The concentration of $SiO_2$ and $TiO_2$ in each composition was fixed at 1.924 and 0.146 moles, respectively, and the concentrations of PbO, ZnO and $Na_2O$ varied from 0 to 1 mole according to the position of the cavity on the plate.

The plate was fired at 550° C. and after cooling was inspected to determine those cavities in which the composition formed a satisfactory glaze.

The satisfactory glazes were formed by compositions falling within the polygon AEFG on the three component chart shown in FIG. 3; the best glazing being within the polygon ABCD.

From this we have ascertained that preferred ratios of PbO, ZnO and $Na_2O$ are:
0.4 to 0.9 mole PbO
0.0 to 0.3 mole ZnO
0.1 to 0.6 mole $Na_2O$
(quantities PbO, ZnO and $Na_2O$, expressed in moles, to sum to 1 as above) and that particularly preferred ratios are:
0.5 to 0.9 mole PbO
0.0 to 0.1 mole ZnO
0.1 to 0.5 mole $Na_2O$
(quantities PbO, ZnO and $Na_2O$, expressed in moles, to sum to 1 as above).

EXAMPLE III

GLAZES AND GLAZING

Glaze compositions were prepared by fritting the appropriate components to give a glaze having the following compositions (expressed as percentages by weight of the total composition):

| | Glaze composition No. 1 | Glaze composition No. 2 |
|---|---|---|
| $SiO_2$ | 43.91 | 41.28 |
| $TiO_2$ | 4.40 | 4.19 |
| PbO | 40.33 | 43.90 |
| ZnO | 2.32 | 2.91 |
| $Na_2O$ | 7.36 | 7.16 |
| $Li_2O$ | 1.67 | — |
| | 99.99 | 99.99 |

These glazes, with or without the addition of conventional coloring and opacifying agents, were finely ground and suspended in water. The glaze suspensions were applied by brushing or spraying on the surface of concrete building blocks formed from the following two concrete types:

Concrete No. 1                        Concrete No. 2

| | | | |
|---|---|---|---|
| Basalt grit | 1,000 parts | Lightweight aggregate (¼-inch) (—Shalite") | 740 parts |
| Basalt Screenings ¼ inch | 1,000 parts | Basalt screenings (¼-inch) | 1,000 parts |
| Cement | 200 parts | Cement | 200 parts |

The thus treated blocks were then fired at 620° C. In each case a satisfactory smooth and firmly adherent glaze was formed on the surface of the blocks.

Compressive strength tests carried out on similar blocks fired without glazing at 620° C. showed that the compressive strength of Concrete No. 1 was reduced from an average of 1,300 p.s.i. (over three blocks) to an average of 1,220 p.s.i. and that of Concrete No. 2 from an average of 1,810 p.s.i. (over three blocks) to an average of 1,590 p.s.i.

The above experiment was repeated except that an underglaze composition comprising 20 weight percent of a sand having the following approximate screen analysis

| Mesh Size (BSS) | Approximate % by weight |
|---|---|
| 28 | 30 |
| 48 | 26 |
| 100 | 15 |
| 150 | 11.5 |
| 200 | 9.8 |
| 325 | 7.9 | and 80 weight percent of Glaze composition No. 2 was applied to the concrete as a slurry and, after drying out, a slurry of Glaze composition No. 2 was applied thereover. The concrete was fired at 620° C. and particularly satisfactory smooth glaze was formed.

EXAMPLE IV

TESTING

Samples of fired Glaze composition No. 2 was subjected to chemical resistance testing according to a method in which a known weight of granulated glaze is heated in a mixture of sulphuric (S.G. 1.84) and nitric (S.G. 1.4) acids until white fumes were evolved. After washing to neutrality and drying the glaze is reweighed. It was found that the loss in weight varied between 0.06 and 0.38 weight percent—this indicates satisfactory acid resistance.

Samples of fired Glaze composition Nos. 1 and 2 were also subjected to testing to determine the solubility of lead oxide in the glaze in acetic acid. The test procedure consisted of immersing granulated glaze in 4 percent acetic acid for ½ hour, and the amount of lead oxide which dissolves out is determined by colorimetric methods. An average PbO loss was 0.06 weight percent.

The preferred glaze compositions of the invention show good acid resistance and thus apart from decorative finishes, they may also be used to protect concrete surfaces from acid attack.

Ceramic stains and pigments and opacifiers may, and usually will, be added to the glaze compositions of this invention. Examples of coloring materials which have been used are CuO, $Cr_2O_3$, $MnO_2$, "Pb Antim"[$Pb_3(SbO_4)_2$], "PbCr"(Pb-$CrO_4$), CoO and a cobalt pigment produced by firing a mixing of 2 percent cobalt oxide (PbO) and zirconium silicate at 1,200° C.

It is to be understood that the present invention includes glaze compositions and concrete articles having glazed surfaces whenever prepared by the above-described techniques.

It will also be appreciated that modifications other than those specifically described can be made to the method, compositions and products of the invention and the invention includes all such modifications which fall within its spirit and scope.

We claim:

1. A method of glazing a surface consisting essentially of hydraulic cement which comprises applying to said surface a glaze composition consisting essentially of, proportionately, (A) 1.4 to 2.6 moles $SiO_2$, (B) 0.1 to 0.2 mole $TiO_2$ and (C) 0.4 to 0.9 mole PbO, 0.1 to 0.6 mole $Na_2O$, 0.0 to 0.2 mole $Li_2O$ and 0.0 to 0.3 mole ZnO, wherein the sum of the amounts of PbO, $Na_2O$, $Li_2O$ and ZnO, expressed in moles, is 1, the balance, if any, consisting of conventional coloring and opacifying agents and thereafter firing the glaze composition at a temperature in the range 550° to 620° to produce a glaze on said surface.

2. A method as claimed in claim 1, wherein after firing the hydraulic cement is cured by exposing it to moisture.

3. A method as claimed in claim 1, wherein said glaze composition consists essentially of, proportionately, (A) 1.41 to 2.54 mole $SiO_2$, (B) 0.105 to 0.190 mole $TiO_2$ and (C) 0.516 to 0.744 mole PbO, 0.070 to 0.097 mole ZnO, 0.128 to 0.264 mole $Na_2O$ and 0.000 to 0.151 mole $Li_2O$ wherein the sum of the amounts of PbO, $Na_2O$, $Li_2O$, and ZnO expressed in moles, is 1.

4. A method as claimed in claim 1, wherein said glaze composition consists essentially of, proportionately, (A) 1.9 to 2.0 mole $SiO_2$, (B) 0.13 to 0.18 mole $TiO_2$ and (C) 0.5 to 0.9 mole PbO, 0.0 to 0.1 mole ZnO and 0.1 to 0.5 mole $Na_2O$ wherein the sum of the amounts of PbO, $Na_2O$ and ZnO, expressed in moles, is 1.

5. An article comprising hydraulic cement when glazed by the method of claim 1.

6. A method as claimed in claim 2, wherein the cement is exposed to moisture by allowing it to weather naturally.

7. A method as claimed in claim 2, wherein the cement is exposed to moisture by immersion in water or by autoclaving.

8. A method of glazing a surface consisting essentially of hydraulic cement which comprises applying an underglaze composition to said surface, said underglaze composition consisting essentially of, proportionally, (A) 1.4 to 2.6 moles $SiO_2$, (B) 0.1 to 0.2 mole $TiO_2$ and (C) 0.4 to 0.9 mole PbO, 0.1 to 0.6 mole $Na_2O$, 0.0 to 0.2 mole $Li_2O$ and 0.0 to 0.3 mole ZnO, wherein the sum of the amounts of PbO, $Na_2O$, $Li_2O$ and ZnO, expressed in moles, is 1, the balance, if any, consisting of conventional coloring and opacifying agents, and a refractory material present as particles and adapted substantially to file imperfections and discontinuities in said surface, thereafter applying a layer of a glaze composition consisting essentially of, proportionally, (A) 1.4 to 2.6 moles $SiO_2$, (B) 0.1 to 0.2 mole $TiO_2$ and (C) 0.4 to 0.9 mole PbO, 0.1 to 0.6 mole $Na_2O$, 0.0 to 0.2 mole $Li_2O$ and 0.0 to 0.3 mole ZnO, wherein the sum of the amounts of PbO, $Na_2O$, $Li_2O$ and ZnO, expressed in moles, is 1, the balance, if any, consisting of conventional coloring and opacifying agents, over the underglaze composition, and thereafter firing the compositions in a single firing stage at a temperature in the range of 550° to 620 C. to produce a glaze on the surface.

9. A method as claimed in claim 8, wherein the glazed hydraulic cement is subsequently cured by being exposed to moisture.

10. An article comprising hydraulic cement when glazed by the method of claim 8.

11. A method of glazing a surface consisting essentially of hydraulic cement which comprises applying a first glaze composition consisting essentially of, proportionally, (A) 1.4 to 2.6 moles $SiO_2$, (B) 0.1 to 0.2 mole $TiO_2$ and (C) 0.4 to 0.9 mole PbO, 0.1 to 0.6 mole $Na_2O$, 0.0 to 0.2 mole $Li_2O$ and 0.0 to 0.3 mole ZnO, wherein the sum of the amounts of PbO, $Na_2O$, $Li_2O$ and ZnO, expressed in moles is 1, the balance, if any, consisting of conventional coloring and opacifying agents, to said surface, applying a second glaze composition consisting essentially of, proportionally, (A) 1.4 to 2.6 moles $SiO_2$, (B) 0.1 to 0.2 mole $TiO_2$ and (C) 0.4 to 0.9 mole PbO, 0.1 to 0.6 mole $Na_2O$, 0.0 to 0.2 mole $Li_2O$ and 0.0 to 0.3 mole ZnO, wherein the sum of the amounts of PbO, $Na_2O$, $Li_2$ and ZnO, expressed in moles, is 1, the balance, if any, consisting of conventional coloring opacifying agents to said first glaze composition and thereafter firing the glaze composition in a single firing stage at a temperature in the range 550° to 620° C. to produce a glaze.

12. A method as claimed in claim 11, wherein the glazed hydraulic cement is subsequently cured by being exposed to moisture.

* * * * *